United States Patent [19]

Hintner et al.

[11] 4,108,501
[45] Aug. 22, 1978

[54] BRAKE ACCELERATOR FOR AIR BRAKE SYSTEM OF A RAILWAY VEHICLE

[75] Inventors: Josef Hintner; Peter Pick, both of Münich, Fed. Rep. of Germany

[73] Assignee: Knorr-Bremse GmbH, Munich, Fed. Rep. of Germany

[21] Appl. No.: 824,745

[22] Filed: Aug. 15, 1977

[30] Foreign Application Priority Data

Aug. 26, 1976 [DE] Fed. Rep. of Germany ....... 2638437

[51] Int. Cl.² .............................................. B60T 17/04
[52] U.S. Cl. ........................................ 303/82; 303/37; 303/69
[58] Field of Search .................. 303/36, 37, 66, 68, 303/69, 70, 82, 86, 81

[56] References Cited

U.S. PATENT DOCUMENTS

| 3,966,269 | 6/1976 | McEathron | 303/66 X |
| 3,988,044 | 10/1976 | Hill | 303/82 |
| 4,026,609 | 5/1977 | Bridigum | 303/82 |

FOREIGN PATENT DOCUMENTS 550,067 10/1956 Italy ............................................ 303/82

*Primary Examiner*—Stephen G. Kunin
*Attorney, Agent, or Firm*—Edmund M. Jaskiewicz

[57] ABSTRACT

A brake accelerator for drawing off air from the brake line of an air brake system for railway vehicles has a piston one side of which is subjected to air pressure in the brake line and the other side is subjected to a control pressure in an expansion chamber connected to the brake line through a throttle opening. A first valve is in a connection between the brake line and a pressure accumulation chamber connected to the atmosphere through a second throttle opening. The first valve is actuated by the first piston when the control pressure exerted on the first piston is predominant. A second valve opens subsequently to the first valve and is located in a connection leading from the expansion chamber through a throttle opening to the atmosphere. The second valve is actuated by a second piston loaded by the pressure in the pressure accumulation chamber in the direction to open the second valve against the force of a spring urging the second valve into its closed position.

5 Claims, 1 Drawing Figure

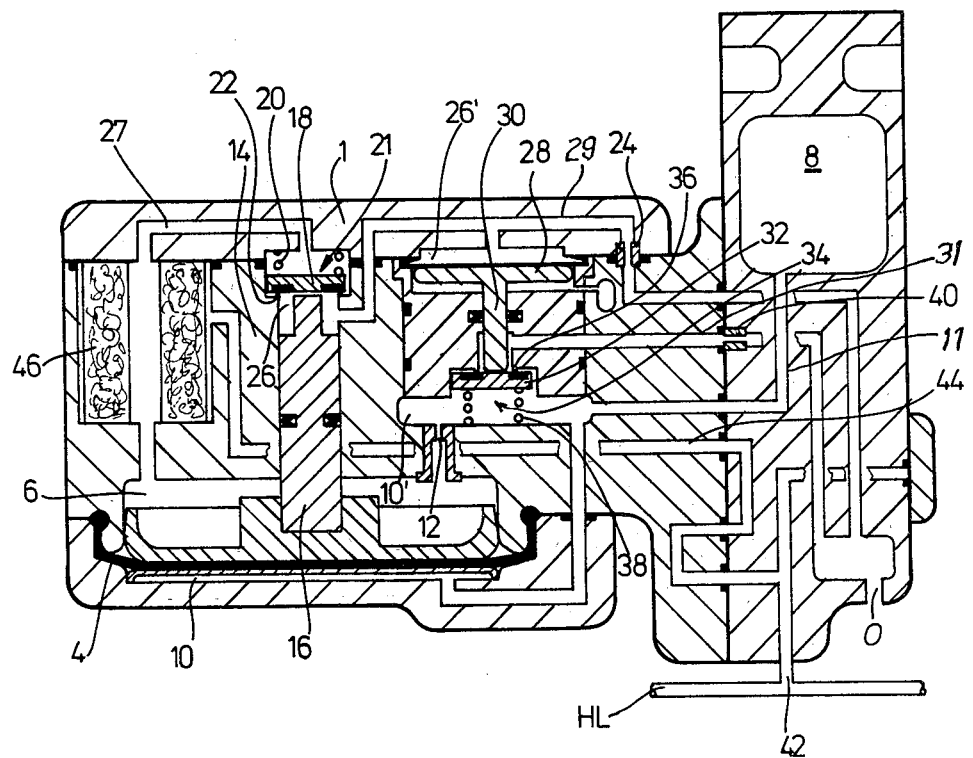

BRAKE ACCELERATOR FOR AIR BRAKE SYSTEM OF A RAILWAY VEHICLE

The present invention relates to a brake accelerator for drawing off compressed air from the brake line of an air brake system of a railway vehicle, more particularly, to improvements in the operation of the accelerator.

Each railway vehicle of a train of vehicles is provided with a brake control valve device connected to the brake line extending throughout the length of the vehicle. The interconnected brake lines of coupled railway vehicles thus form a brake line extending throughout the length of the train and the pressure in this brake line is regulated by the train operator through a control valve in order to brake the train. During a braking operation, the operator generally applies the braking in stages so that there is an initial light reduction in brake line pressure and subsequent further reductions to provide the proper degree of braking. This braking is accomplished through a service brake portion of the control valve. Each control valve is further provided with an emergency brake portion by means of which a rapid decrease in brake line pressure is achieved to bring about emergency braking.

Such brake control valves have also been provided with an accelerator device, which actuates the control device to achieve a quick and uniform drop in pressure during service braking, even though some of the vehicles may not have quick service valves or the vehicles may be of different sizes so as to have different volumes of air in their brake air lines.

Such a brake accelerator may of the type as disclosed in U.S. Pat. No. 3,175,871 wherein compressed air is drawn off from the air line of an air brake system of railway vehicles. When the air line pressure acting upon one side of a piston is decreased such that the control pressure on the other side of the piston is predominant, a first valve is opened. This first valve is located in a connection between the air line and a control pressure chamber connected to the atmosphere through a constriction or throttle opening. After the first valve opens, the piston opens a second valve by means of a plunger or some other element which is displaceable upon movement of the piston. The second valve is located in a connection leading from an expansion chamber through a throttle opening to the atmosphere.

The displaceable element which effects the sequential opening of the valves operates on the basis of the mechanical friction between the two components which are coupled to each other with play and movable with respect to each other to a limited extent. One of these components is attached to the piston and the other to the displaceable valve member of the second valve. In service, defects may occur in such a structure because of wear and vibration of the components occurring during operation of the vehicles or under temperature changes. These defects may cause variations in the actuating time of the second valve so that the time period between the sequential opening of the valves is varied. The result is that the brake has an undesirable response. The control and operation of a valve which has this inherent deficiency is unsatisfactory for use in railroad operation for controlling brake accelerator devices in view of the shocks and vibrations to which railway vehicles are subjected during operation.

It is therefore the principal object of the present invention to provide a novel and improved brake accelerator for drawing off air from the brake line of an air brake system of a railway vehicle.

It is another object of the present invention to provide such a brake accelerator which avoids operation based upon the physical principle of friction and the displaceability of the operating components.

It is a further object of the present invention to provide such a brake accelerator which is simple in construction, reliable in operation, inexpensive in manufacture and installation and which eliminates faults in the actuation of the components of the accelerator.

It is an additional object of the present invention to provide such a brake accelerator device whose operation is based exclusively upon pneumatic means and avoids operation based upon external power sources.

According to one aspect of the present invention a brake accelerator for drawing off air from the brake line of an air brake system for railway vehicles may comprise a first piston one side of which is subjected to air pressure in the brake line. The other side of the piston is subjected to a control pressure opposing the brake line pressure. The control pressure is in an expansion chamber connected by a throttle opening to the other side of the piston. The other side of the piston is connected to the atmosphere through a second throttle opening and a first valve is provided to close this connection. A piston is provided with means for opening the first valve when the control pressure predominates over the brake line pressure. Second passage means including a third throttle opening connects the expansion chamber to the atmosphere and a second valve closes the second passage under the action of a spring. A second piston is located in a pressure accumulation chamber disposed in the first passage and located between the second throttle opening and the brake line pressure side of the first piston. The second piston actuates the second valve when displaced by pressure in the pressure accumulation chamber in a direction to open the second valve against the closing force of the spring.

Other objects and advantages of the invention will be apparent upon reference to the accompanying description when taken in conjunction with the following drawing, which is exemplary, wherein the single drawing is a sectional view illustrating schematically the brake accelerator according to the present invention.

In the illustrated embodiment, the accelerator comprises a housing 1 in which is formed a cylindrical chamber having movably mounted therein a diaphragm piston 4 whose peripheral edge is secured in an air-tight relationship to the housing as shown in the drawing. The diaphragm piston 4 forms on one side thereof with the housing a first sub-chamber 6 which is subjected to the action of air from the air line or brake line HL and on its other side a second sub-chamber 10 which is connected to an expansion chamber 8 through passages 9 and 11. The second sub-chamber 10 has the function of a control chamber and is connected to the first sub-chamber 6 in known manner through a constriction or throttle opening 12 which opens into a chamber 10' and the passage 9.

The diaphragm piston 4 has axially extending therefrom a guide extension 16 which is slidably and sealingly guided in an air-tight manner through a wall 14 of the housing 1. The end of the extension 16 away from the piston 4 is engagable with a plate valve member 18 in a direction to open the valve member. The valve member 18 is loaded in the closing direction by spring 20 and engages an annular valve seat 22 formed in the wall 14 of housing 1 to define a valve indicated generally at 21.

A chamber 26 is formed on the seat side of valve member 18 and is connected to the atmosphere through a passage 29 in which is formed a constriction or throttle opening 24 and which passage leads to a vent opening O. The chamber 26 is thus separated by the plate valve member 18 from passage 27 which leads to the sub-chamber 6 connected to the brake line pressure.

A chamber 26' connects to passage 29 between chamber 26 and throttle opening 24 and a piston 28 is movably positioned therein. The side of piston 28 away from the chamber 26' is vented to the atmosphere and is provided with an axially extending rod or valve plunger 30 which slidably and sealingly passes through a wall portion 14 of the housing to be engageable with a valve plate 32 of a shut-off valve indicated generally at 34. The end of the valve plunger 30 passes through a valve seat 36 formed in the wall portion 14 and the plate valve member 32 is held in the closed position against valve seat 36 under the force of a spring 38. The valve 34 controls the connection of a chamber formed on the valve seat side of valve member 32 and the chamber 10' to a connection to the atmosphere through a passage 31 having a throttle opening 40 therein and connected to the atmosphere through vent opening O. The sub-chamber 6 is connected to the brake line HL through a passage 42, a passage 44 and a filter 46.

In operation, the brake accelerator of the present invention functions as follows:

The piston 4 of the brake accelerator compares on one side thereof the brake line pressure HL with the control pressure in sub-chamber 10 and formed through a definite connection from expansion chamber 8 through the throttle opening 12. When a predetermined decrease in the brake line pressure is exceeded, such as during a braking operation, the pressure in chamber 6 will decrease so that an increasing pressure difference will exist between the sub-chambers 6 and 10. The pressure difference will cause the pressure in control chamber 10 to move the diaphragm piston 4 in an upward direction as viewed in the drawing such that an opening force is transmitted by guide extension 16 to the plate valve member 18. When this opening force is greater than the opposing closing force generated by the spring 20 and required at least for a reliable seating of the valve 21 with respect to the atmosphere, the valve member 18 will be lifted from its valve seat 22 to open the valve 21 to permit air to flow from the brake line through passage 29 and throttle opening 24 to the atmosphere through vent opening O.

The piston 28 will be subjected to the action of air accumulating in passage 29 in front of the throttle opening 24 and this pressure will move valve member 28 downwardly as seen in the drawing to cause the valve plunger 20 to act upon valve member 32 whereby the valve 34 is open, upon overcoming the closing force applied by the spring 38 for sealing of the valve seat 36 with respect to the atmosphere. The opening of valve 34 thus communicates sub-chamber 10 through passage 31 and throttle opening 40 to the atmosphere through vent O.

The relative cross-sectional areas of the throttle openings can be so selected that the control air in sub-chamber 10 under piston 4 will escape to the atmosphere at a faster rate than the brake line pressure within sub-chamber 6 acting on the upper side of the piston. This will reduce the opening force on the valve member 18 until valve 21 is closed which interrupts the connection of the brake line pressure to atmosphere vent opening O. The resulting reduction in the pressure in the pressure accumulation chamber acting upon the piston 28 reduces the opening force until valve 34 is closed. This closing of valve 34 interrupts the connection between control pressure sub-chamber 10 and atmosphere vent opening O.

As result of this switching sequence, a braking stage as determined through the operator's actuation of the brake control valve is set or maintained by suitable lowering of the brake line pressure on the individual vehicles of the train and is transmitted to successively coupled vehicles.

It is preferable that the surface of piston 28 upon which pressure in the pressure accumulation chamber is exerted is substantially smaller than the surface of piston 4 which is subjected to the action of the brake line pressure in sub-chamber 6.

The brake accelerator according to the present invention may be constructed both as a service brake accelerator and as an emergency brake accelerator merely by suitable variation in the sensitivity of response of the accelerator to reduction of pressure in the brake line. The brake accelerator may be incorporated directly into the air line or may also be combined structurally with the brake control valve.

Thus it can be seen that the present invention has disclosed a brake accelerator wherein a second valve is controlled by a second piston loaded in the direction to open the second valve and the second piston is actuated by pressure in a pressure accumulation chamber such that the piston acts at the most against the force of a closing spring.

It will be understood that this invention is susceptible to modification in order to adapt it to different usages and conditions, and accordingly, it is desired to comprehend such modifications within this invention as may fall within the scope of the appended claims.

What is claimed is:

1. A brake accelerator for drawing off air from the brake line of an air brake system for railway vehicles and comprising a first piston having one side subjected to air pressure in a brake line, means including an expansion chamber connected to the other side of said first piston for subjecting said other side to a control pressure opposing the brake line pressure, there being a throttle opening between said one side of the first piston and the connection from said expansion chamber to said other side of the first piston, first passage means having a second throttle opening therein for connecting said one side of the first piston to the atmosphere, a first valve closing said first passage means, means on said first piston for opening said first valve when the control pressure on the other side of the first piston predominates over the brake line pressure on said one side of the piston, second passage means including a third throttle opening for connecting said expansion chamber to the atmosphere, a second valve closing said second passage means and spring means urging said second valve into the closed position, a pressure accumulation chamber in said first passage means between said second throttle opening and said one side of the first piston, and second piston in said pressure accumulation chamber and having means thereon for actuating said second valve, said second piston acted upon by pressure in said pressure accumulation chamber in a direction to open said valve against the closing force of said spring means.

2. A brake accelerator as claimed in claim 1 wherein the area of said second piston acted upon by pressure within said pressure accumulation chamber is substantially smaller than the area of said first piston acted upon by the brake line pressure.

3. A brake accelerator as claimed in claim 1 wherein the cross-section area of the third throttle opening is greater than the cross-section area of said second throttle opening.

4. A brake accelerator as claimed in claim 1 and further comprising means including a wall portion of a housing spaced from the side of said second piston away from the pressure accumulation chamber for defining a chamber having a vent to the atmosphere, said second piston actuating means comprising a plunger passing through said chamber and through said wall portion, said plunger having an end terminating in a second chamber, said second valve being disposed in said second chamber.

5. A brake accelerator as claimed in claim 4 wherein said second valve comprises a valve seat in said second chamber and a valve member engaging said valve seat in the closed position, the end of said plunger actuating said valve member into the opened position against said spring means when said second piston is acted upon by pressure in said pressure accumulation chamber so that said second passage means is opened.

* * * * *